Feb. 27, 1962    J. M. SANFORD    3,023,328
REGULATABLE ELECTRIC MOTOR FOR ACCOMPLISHING
LINEAR MOVEMENT
Filed Sept. 6, 1957
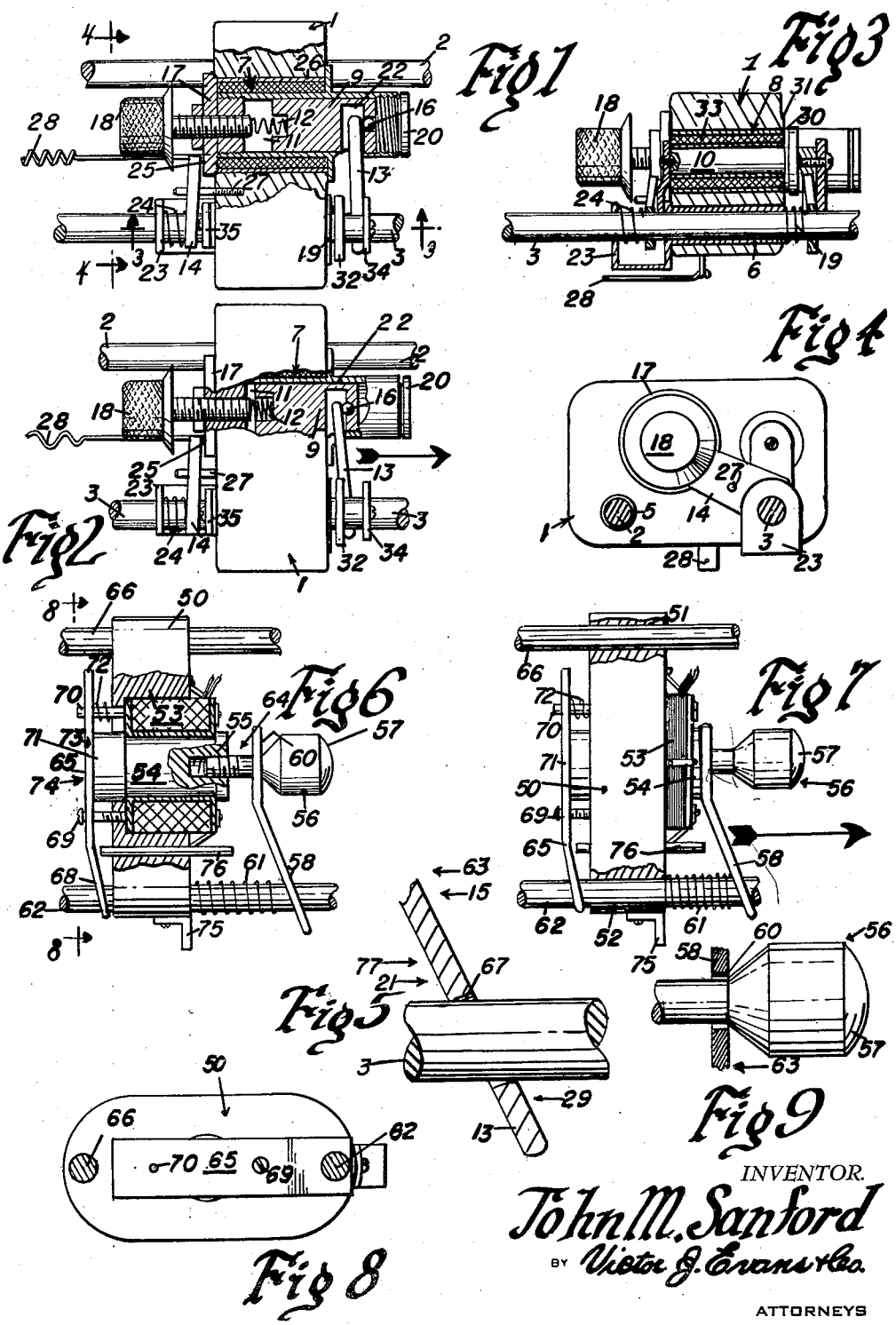
INVENTOR.
John M. Sanford
BY Victor J. Evans & Co.
ATTORNEYS

3,023,328
REGULATABLE ELECTRIC MOTOR FOR ACCOMPLISHING LINEAR MOVEMENT
John M. Sanford, 4313 S. 12th St., Terre Haute, Ind.
Filed Sept. 6, 1957, Ser. No. 682,480
2 Claims. (Cl. 310—14)

The present invention relates to an electric motor, and more particularly to an electric motor which is capable of linear movement.

The object of the invention is to provide an electric motor which can be moved linearly and wherein the amount of movement of the motor can be regulated or varied as desired.

Another object of the invention is to provide a linear electric motor which is highly efficient, and which has a wide range of step sizes and continuous travel speed, and wherein the linear electric motor of the present invention includes an electro-mechanical releasing mechanism that permits the motor to be reset to its starting point either by remote control, or by means of a limit switch which is placed in the path thereof.

A further object of the invention is to provide a linear electric motor which is extremely simple and inexpensive to manufacture.

Other objects and advantages will be apparent during the course of the following description.

In the accompanying drawings, forming a part of this application, and in which like numerals are used to designate like parts throughout the same, FIGURE 1 is a fragmentary plan view illustrating the linear electric motor of the present invention, and with parts broken away and in section.

FIGURE 2 is a view similar to FIGURE 1, but showing the motor in shifted or moved position.

FIGURE 3 is a sectional view taken on the line 3—3 of FIGURE 1.

FIGURE 4 is a sectional view taken on the line 4—4 of FIGURE 1.

FIGURE 5 is a fragmentary sectional view illustrating the locking connection of a thin plate loosely fitting on a smooth rod.

FIGURE 6 is a fragmentary plan view illustrating a modification, and with parts broken away and in section.

FIGURE 7 is a view similar to FIGURE 6, but showing the motor moved.

FIGURE 8 is a sectional view taken on the line 8—8 of FIGURE 6.

FIGURE 9 is a fragmentary sectional view illustrating the mounting of the armature on the screw member.

Referring in detail to the drawings, and more particularly to FIGURES 1–4 of the drawings, the numeral 1 indicates a motor block which can be made of light weight non-magnetizable material such as plastic, aluminum or the like, and the block 1 is supported on spaced parallel rods 2 and 3 by means of brass bushings 5 and 6, and sufficient clearance is provided so as to permit free sliding movement in either direction. Mounted in the motor block 1 are two electro-magnetic solenoids 7 and 8 which have movable cores 9 and 10. In the following description, this entire assembly will be referred to as the motor block assembly 1.

It is to be noted that when an electric current is caused to flow in the winding of the stepping solenoid 7, its core 9 which is made of soft steel and which may be cylindrical in shape, and which is fitted to slide freely in the brass solenoid frame 22, is pulled into the solenoid in a direction to the left looking at FIGURE 1 for example, due to the magnetic field which appears in the air gap at 11 so as to compress the spring 12 and this moves the entire motor block assembly 1 to the right a distance equal to the length of the air gap 11, as later described in this application.

In FIGURE 5 there is shown a view which illustrates the contact the stepping finger plate 13 or the locking finger plate or arm 14 makes with the supporting rod 3. This is the usual locking action of a loosely fitting thin plate on a smooth rod which prevents relative motion of the two parts when a force is applied in the region of and in the direction of the arrow 15.

The stepping solenoid core 9 makes contact with the stepping finger plate 13 by means of a hard steel ball 16 which is axially mounted in the solenoid core 9 as shown in FIGURE 1. When the stepping solenoid 7 is energized by a suitable electric current which can be supplied from a suitable source of electric energy, the core 9 will be pulled towards the stepping solenoid end plate 17 and adjusting screw 18, a force in the region of and in the direction of the arrow 15 is applied to the stepping finger plate 13 on the rod 3 and prevents their relative motion. Since the motor block assembly 1 slides freely on its supporting rods 2 and 3, the entire motor block assembly 1 will move to the right a distance equal to the length of the air gap 11 between the end of the stepping solenoid core 9 and the adjusting screw 18. This action will serve to compress the solenoid core return spring 12 and will also compress the stepping finger plate return spring 19.

When the stepping solenoid 7 is de-energized by stopping the flow of current in its coil 7, the return spring 12 will push the core 9 to the right away from the adjusting screw 18 until it comes to rest against the plug 20 which is threaded into the end of the brass solenoid frame 22. Simultaneously, the stepping finger plate return spring 19 pushes the stepping finger plate 13 to the right so as to cause it to unlock from and slide along the rod 3 until it again makes contact with the steel ball 16. This sliding action occurs because the return spring 19 applies a force in the region of and in the direction of the arrow 21, FIGURE 5, during a time while there is no force being applied to the stepping finger plate 13 in the region of, and in the direction of the arrow 15 in FIGURE 5.

When the stepping finger plate 13 again makes contact with the steel ball 16, a force in the region of and in the direction of the arrow 15 is again applied and this combination of forces 15 and 21 twists the stepping finger plate 13 with a counterclockwise rotation and re-establishes the locked condition between the rod 3 and the plate 13.

This cycle of events occurs each time the stepping solenoid 7 is energized and subsequently de-energized, and can occur as rapidly as 120 per second or the like. This stepping rate is accomplished by applying 60 cycle power line sine wave voltage which is commonly used, to the stepping solenoid coil 7. Each half wave energizes and de-energizes the motor so as to result in 120 steps per second. The adjusting screw 18 can be advanced to the right to shorten the air gap 11 and thus make each step smaller, or else it can be retracted to the left to make each step larger. As a specific example, the motor can be built so as to have a continuously variable step range from .002 inch per step to .100 inch per step. This step size is determined by the physical constants involved and the upper and lower limits of step size may vary as desired.

During the energization part of the cycle, the motor develops a thrust which can be imparted to a load attached to or in contact with the motor block assembly 1. Thus, contact may be made with the plug 20 which is made of non-magnetizable material and which is threaded into the brass solenoid frame 22. If the load offers a continuous resistance during the de-energization portion of the cycle, it may push the motor back toward its starting point unless some locking action of the motor prevents this.

The locking finger plate or arm 14 provides this locking action in this manner. During the energization portion of the cycle, the entire motor block assembly 1 moves to the right and the bracket 23 which is part of this assembly, tends to compress the locking finger plate spring 24, which in turn pushes against the locking finger plate 14 in the region of and in the direction of the arrow 21, FIGURE 5, so as to unlock the finger plate 14 and carry it to the right with the motor block assembly 1. The spring 24 also tends to keep the locking finger plate 14 in contact with the solenoid end plate 17 through the hard steel ball 25 so that when the de-energization portion of the cycle occurs, any force acting to the left on the motor block assembly 1 will cause the solenoid end plate 17 to apply a force in the region of and in the direction of the arrow 15 to the locking finger plate 14 and the rod 3 and prevent the motor from losing ground. This also assures that the stepping finger plate 13 is pushed to the right away from the motor block assembly 1 to a new position as heretofore described.

The stepping mechanism consists of an electric solenoid and the electro-mechanical releasing mechanism also consists of an electric solenoid. The plates 13 or 14 are loosely fitted on the rod 3 whereby the locking action is accomplished.

In the next submitted construction, the locking action depends in part upon the magnetic field developed by the stepping coil, but in the presently described form of the invention, magnetism plays no part in the action of the locking finger plate 14. There is no magnetic field present at the contact point between the steel ball 25 and the solenoid end plate 17, since the solenoid end plate 17, the adjusting screw 18, and the outer solenoid case 26 form a closed magnetic circuit with no air gaps to give rise to an external magnetic field. The locking action is thus completely mechanical in nature.

A pin 27 fits loosely in a matching hole in the locking finger plate 14 and serves as a support and guide for keeping the plate 14 in its proper position.

During the time that the motor block assembly 1 is being moved to the right by the stepping action of the motor, the return spring 28 is being placed in tension. Return or reset of the motor to its starting position or to any intermediate position is accomplished by simultaneously unlocking both finger plates 13 and 14 and allowing the return spring 28 to pull the motor to the left. These finger plates 13 and 14 are unlocked by a force acting in the region of and in the direction of the arrow 29, FIGURE 5. In the presently described form of the invention, the unlocking force is supplied by the action of the release solenoid 8. When the release solenoid 8 is energized by passing an electric current through its coil, the solenoid core 10 is moved to the left by the magnetic field which appears in the air gap 30 between the outer steel shell 31 of the solenoid and the soft steel ring 32 which is part of the soft steel core 10.

The solid, cylindrical, steel core 10 fits loosely in its matching hole in the brass frame 33 of the solenoid, and extends completely through the frame 33 and protrudes at both ends.

On its right end, the core 10 carries a release finger 34 which extends downward and makes mechanical contact with the stepping finger plate 13 in the region of the arrow 29. On its left end the core 10 carries another release finger 35 which also extends downward and which makes mechanical contact with the locking finger plate 14 also in the region of arrow 29. When the core 10 moves to the left during energization of the solenoid 8, its motion is imparted to the stepping finger plate 13 and the locking finger plate 14 by the respective release fingers 34 and 35 and therefore a force acting in the region of and in the direction of arrow 29 is applied to the stepping finger plate 13 and the locking finger plate 14 which unlocks these plates from the rod 3 simultaneously and permits the return spring 28 to pull the motor block assembly 1 to the left towards its starting point.

After the release solenoid 8 is de-energized, the stepping finger plate return spring 19 and the locking finger plate return spring 24, which have been compressed by the previously described unlocking action, restore their respective finger plates 13 and 14 to a locked position and push the release solenoid core 10 to the position it had before energization of the coil 8, so as to halt the progress of the motor block assembly 1 under the pull of the return spring 28. The energization and de-energization of the release solenoid 8 can be accomplished by limit switches which are placed in the path of the motor or may be accomplished by remote switches controlled by an operator or by some programming apparatus.

In the present form of the invention the rod 2 serves only as a support and guide and does not function in the action of the motor and if desired it may be dispensed with in certain instances.

The motor of the present invention may be constructed with two stepping solenoids and two release solenoids and with one pair operating on each of the two rods so that one motor will pull the motor assembly to the right and the other would pull it to the left. This could be accomplished by simultaneously energizing a stepping solenoid and the opposite release solenoid so as to permit progress in either direction.

If the rod 3 is free to move and the motor block assembly is fixed, then the rod will be moved and it is intended that this principle be incorporated in the present invention.

If two motors are incorporated into the same motor block assembly as described previously, so that one motor acts in one direction and the other motor acts in the opposite direction, and the two rods are free and the motor block fixed, then the two rods can be moved in opposite directions with respect to the motor block assembly, and this principle is also intended to be part of the present application.

The present invention thus includes a stepping principle and also the combination of a magnet and a locking mechanism. Depending on the type of power supplied, the stepping action will be one step for each closing and opening of a switch or the stepping will be continuous as long as the current is on. This makes the motor of wide application even in fractional horsepower models.

Referring now to FIGURES 6–9 of the drawings, there is shown a modified linear electric motor wherein the motor moves itself along a smooth rod in a series of steps of controllable length advancing one step for each energization and de-energization of its integral electromagnet. If the rod be free and the motor fixed, the motor will move the rod through the motor block in a series of steps.

In FIGURE 6 there is illustrated a top plan view of the machine and FIGURE 5 illustrates the contact point on the rod which is essential to the action of the present machine.

The machine of FIGURES 6–9 includes a block 50 of light, rigid, non-magnetizable material such as acrylic plastic, aluminum, Bakelite, wood or the like, and which is mounted so as to slide freely on one or more smooth parallel fixed rods at points 51 and 52. While the rods have been illustrated as round, it is to be understood that they may be of any desired cross section but they are of hard material such as steel. The rods are smooth and the material of which they are made may or may not be magnetizable. The holes through the block 50 at 51 and 52 are smooth and parallel and fit on the rods with just enough clearance to slide freely. In certain cases, they need not be of exactly the same cross section as the rods as long as there is a guiding fit.

There is further provided a coil of copper wire 53 which is wound on a soft iron core 54 that is mounted centrally in the block 50 with its ends protruding slightly from either side of the block 50 so as to form an electromagnet, with the soft iron core 54 being the pole piece.

In one end of the pole piece 54 is threaded a hole 55 into which is inserted a matching threaded screw member 56. The screw member 56 is preferably of non-magnetizable material such as brass or aluminum, and its unthreaded end 57 is in the form of a knob by which it may be grasped and turned to adjust the depth to which the screw 56 is inserted into its matching threaded hole 55.

A soft iron plate 58 which may be designated as an armature, fits loosely on the unthreaded portion of the rod or screw 56 at point 60 as shown in FIGURE 6 for example.

A compression spring 61 pushes the armature 58 away from the block 50 and against the large end 57 of the rod 56 so that the armature 58 makes contact with the rod 62, and this produces a locked contact between the armature 58 and rod 62 so that a force applied in the direction of and in the region of the arrow 63 will produce no relative motion between the armature 58 and rod 62. This is the familiar locking action of a relatively thin piece of material that fits loosely on a smooth rod and twisted with respect to the rod.

When the electro-magnet 53, 54 is energized by an electric current, a magnetic field occurs in the air gap 64 and the soft iron armature 58 is attracted to the pole piece 54. Since this applies a force in the direction of arrow 63 and in the region of arrow 63, the armature 58 locks on the rod 62 and remains fixed as previously described, while the motor assembly consisting of the block 50, electromagnet 53, 54, and the armature 65 slides along the rods 62 and 66 toward the armature 58 until the air gap 64 is closed and the armature 58 is in contact with the pole piece 54. The distance moved during this action can be varied from step to step by varying the length of the air gap between the pole piece 54 and the armature 58. This variance is accomplished by advancing the screw 56 into or out of its matching hole 55 in the pole piece 54.

When the electro-magnet 53, 54 is de-energized by stopping the flow of current in its coil, the end of the armature 58 is released from the pole piece 54 and the compression spring 61 unlocks the armature 58 from the rod 62 by applying a force in the region and in the direction of the arrow 77, and thus pushes the armature 58 away from the block 50 until it again rests against the large end 57 of the rod 56 and is again locked on the rod 62 at the point 67, FIGURE 9.

During this action of the spring 61 in pushing the armature 58 and block 50 apart, the other armature 65 which is also made of soft iron, assures that the armature 58 will be pushed forward relative to the motor assembly rather than the motor assembly being pushed back relative to the armature. The locking action of the rear armature 65 is accomplished in the following manner. The armature 65 fits loosely on the rod 62 at the point 68 in the same manner as the front armature 58 illustrated in FIGURE 5. The armature 65 fits loosely on the scarew 69 and loosely on a smooth pin 70 and is not mechanically connected to the pole piece 54 at the point 71. The compression spring 72 holds the armature 65 away from the block 50 and causes it to pivot slightly under the head of the screw 69 for which pivoting action clearance is provided by the adjusting screw 69. This pivoting action brings about a locked condition between the armature 65 and the rod 62 at the point 68 when a force acting in the direction of and in the region of arrow 73 is applied to the armature 65. This is exactly the kind of force exerted by the pole piece 54 on the armature 65 during the restoring action of spring 61 previously described and this insures that the front armature 58 will be moved forward away from the motor rather than the motor moved backward away from the armature 58.

A force applied to the rear armature 65 in the direction and in the region of arrow 74 has an unlocking action on the armature 65 and rod 62 lock, and such a force will cause the armature 65 to slide forward, that is to the right in the drawings. During the time that the electromagnet is energized, its pole piece 54 exerts just such a force on the rear armature 65 at the point 71 and so carries the armature 65 along with the motor assembly. During this action the head of the screw 69 is not in contact with the armature 65 and plays no part in carrying the armature 65 with the motor assembly 50, 53 and 54.

The action just described occurs in one complete cycle for each magnetization and subsequent de-magnetization of the electro-magnet 53, 54, so that the entire assembly moves along the fixed rod 62 in a series of steps. The rod 66 serves only as a guide and support and has no other action in the process. The power developed, the step size, and the elapsed time of each step is a function of the physical constants employed in the construction and adjustment of the motor. With proper adjustment, the steps can be accomplished as rapidly as 120 times per second when the coil is energized with 60 cycle per second sine wave power such as that in common use today.

When energized by 60 cycle per second sine wave power, one step is taken for each half wave, with a resulting frequency of 120 steps per second. The device can be constructed so that it can be adjusted to make single steps as small as $\frac{1}{300}$ inch or smaller and as large as $\frac{1}{16}$ inch. More powerful models could be constructed to take larger steps and more precise models may be constructed to take smaller steps, and the rate of operation of the motor can vary as desired.

When the motor is held fixed and the rod 62 is free to move, the motor action moves the rod 62 in a series of steps relative to the motor.

The motor may be moved freely in either direction along the rods 66 and 62 by releasing the locking action of the armatures 65 and 58 simultaneously. In this motor, the unlocking action is obtained by grasping the end of the armature 58 and the bracket 75 between the thumb and forefinger and pressing the end of the armature 58 toward the bracket 75. This brings the armature 58 in contact with the pin 76, which fits loosely in its hole in the motor block 50 and slides the pin 76 against the rear armature 65 so as to cause the armature 65 to pivot about the head of the screw 69. This action unlocks both armatures 58 and 65 simultaneously and allows free movement of the entire motor assembly in either direction along the rods 66 and 62.

The previously described unlocking action may be accomplished by means of an electro-magnet mounted on bracket 75 and so oriented as to attract the front armature 58 and give it the same motion as that imparted by the thumb and forefinger, and such an improvement is contemplated within the scope of the present invention. Also, a return spring may be attached to the motor to pull it back to its starting point when the armatures are released.

The motor assembly will slide forward in the direction of arrow 74 without unlocking the armatures if a force having this direction is applied to it. The locking action of the armatures 58 and 65 is effective only against forces acting in the direction of arrow 73.

Thus, it will be seen that according to the present invention, there is provided a new type of electric motor which includes or uses an electro-magnet to attract a piece of soft iron and there is also provided a locking action of the armatures. The motor can move itself relative to a fixed rod upon which it acts, and the motor may move a rod relative to a fixed motor.

It is to be understood that the principle of the present invention is applicable to all such motors acting on this principle regardless of size and power and of any design which incorporates this principle as the source of motion, whether it be through the action of a pole piece attracting an armature as in the motor described or through solenoid action wherein the armature is attached to a piston or solenoid core within the magnet core.

It will be seen that according to the present invention the linear motor includes the stepping principle as well as the combination of a magnet and locking means. Depending on the type of power supplied, the stepping action will be one step for each closing or opening of a switch or the stepping will be continuous as long as the current is on and this makes the motor of wide application even in fractional horsepower models.

For single steps, both armatures are necessary. For continuous stepping the motor will run without the rear armature and even may run better without it at high speed.

The stepping mechanism of the motor can be used to operate certain useful instruments such as instruments used in scientific investigations and in laboratories. For example, the device may be used for metering out water in controlled amounts, as for example when such water is being supplied to experimental animals and plants, and also, a syringe may be incorporated therewith for use in the chemical or pharmaceutical fields to measure and add reagents, fill ampoules and the like. Or, the device may be used to carry a writing pen across a sheet of paper in single steps while the entire assembly is carried the length of the paper by a motor driven screw so as to produce a cumulative record graph whose slope is the derivative of the function producing it. Such a motor as this could be used to push parts together in an automatic assembling process or to tune a radio by sliding a core into or out of a coil. As a large motor it could move a cable such as a winch, hoist or elevator.

As previously stated, it is understood that the present application includes all motors acting on the principle of the present invention of any size or power and of any design which incorporates this principle as the source of motion, whether it be through the action of a pole piece attracting an armature as in one form of the invention or through a solenoid action as in the other form of the invention.

The supporting rods and solenoid cores need not be of circular cross section, but may be of any practical cross section which will permit the motion described. Furthermore, permanent magnets may be used in the solenoid system to obtain more power and a holding action between the solenoids and their respective cores.

In summary it will be seen that there has been provided an electric motor which is capable of linear movement and wherein the amount of movement of the motor can be regulated or varied as desired or required. The linear electric motor of the present invention is adapted to have a wide range of step sizes and continuous travel speed, and wherein there is provided an electro mechanical releasing mechanism for permitting the motor to be reset to its starting point as for example by remote control, or else the switch means can be placed in the path thereof for permitting the motor to be reset to its starting point.

Minor changes in shape, size and rearrangement of details coming within the field of invention claimed may be resorted to in actual practice, if desired.

I claim:

1. In a linear electric motor, a motor block of non-magnetizable material, first and second spaced parallel rods extending through said block, first and second electro-magnetic solenoids mounted in said block, a movable core for coaction with each of said solenoids, a first coil spring engaging the core in said first solenoid, a stepping plate provided with an opening for the projection therethrough of said second rod, said first solenoid including a frame, a first plug mounted in the end of the frame of the first solenoid, a second plug mounted in the opposite end of the frame, an adjusting screw engaging said first coil spring, a locking plate arranged in engagement with said second rod, a second coil spring abutting said locking plate, a bracket extending from said motor block and having said second coil spring arranged in engagement therewith, a ring mounted on the core of the second solenoid, and a release finger extending downwardly from the core of the second solenoid to engage the locking finger plate and unlock the locking finger plate during the unlocking action of the solenoid, and a second release finger extending downwardly from the core of the second solenoid to engage the stepping plate and unlock the stepping plate during the unlocking action of the solenoid.

2. The apparatus as defined in claim 1, and further including a return spring connected to said motor block.

References Cited in the file of this patent

UNITED STATES PATENTS

| | | |
|---|---|---|
| 631,339 | Spinney | Aug. 22, 1899 |
| 668,978 | Carlson | Feb. 26, 1901 |
| 769,996 | Fleming | Sept. 13, 1904 |
| 2,617,050 | Weinfurt | Nov. 4, 1952 |
| 2,831,990 | Young | Apr. 22, 1958 |